Jan. 26, 1932.  R. M. MATSON  1,842,976
CONTROL SYSTEM
Filed March 20, 1930
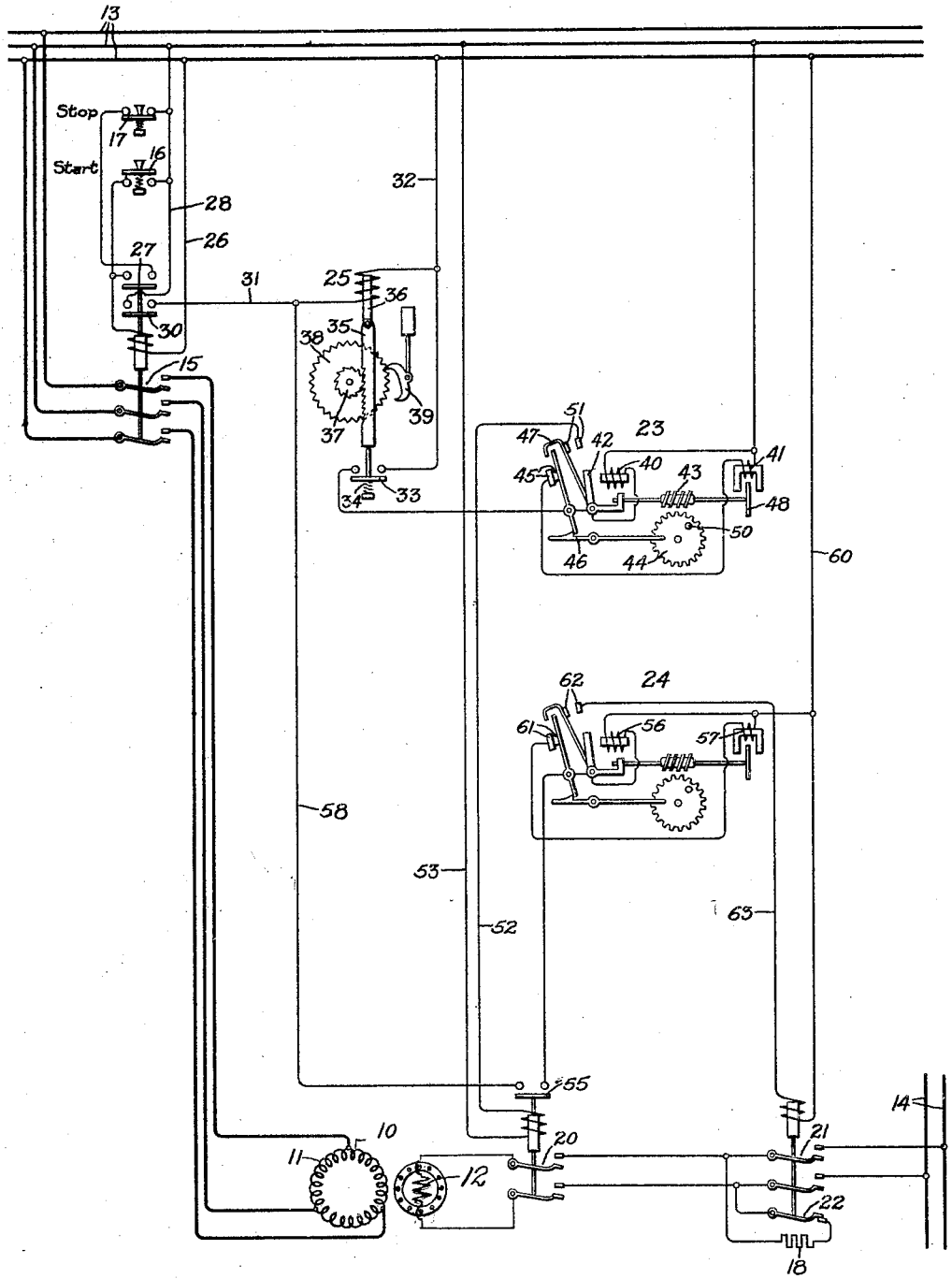
Inventor:
Richard M. Matson,
by Charles E. Tullar
His Attorney.

Patented Jan. 26, 1932

1,842,976

UNITED STATES PATENT OFFICE

RICHARD M. MATSON, OF ITHACA, NEW YORK, ASSIGNOR TO GENERAL ELECTRIC COMPANY, A CORPORATION OF NEW YORK

CONTROL SYSTEM

Application filed March 20, 1930. Serial No. 437,527.

My invention relates to control systems, more particularly to control systems for alternating current synchronous motors, and has for its object the provision of an improved method and means for starting and accelerating synchronous motors to their synchronous running speeds, and for bringing the motors to rest.

The difficulty of starting and accelerating a synchronous motor to its synchronous running speed is a well-known inherent characteristic of the machine, and is due to the fact that the synchronous motor develops torque due to pure synchronous-motor action only when running at substantially synchronous speed. It is customary to provide synchronous motors with an auxiliary alternating current starting winding so that the motor may be started and accelerated as an induction motor, the synchronous-motor action becoming effective at synchronous speed. The field windings provided for the synchronous motor are disconnected from their direct current exciting source during the starting period. In some instances the field winding circuit has been left open; in other instances the field winding circuit has been closed, usually through a suitable discharge resistance.

The nature of the load to be started and accelerated has to a large extent been the determining factor in the choice of the field characteristics to be employed in starting. This is true because the torque characteristics of the motor with its field circuit open and those with its field circuit closed are more or less opposed in their influence on the choice of the field circuit to be used. The motor with an open field circuit will develop a much larger starting torque than it would if its field circuit were included in a local circuit. On the other hand, the motor torque in the first instance decreases rapidly as the motor approaches synchronous speed, while in the second instance the motor maintains its torque at these higher speeds. In other words, the motor with its field included in a local circuit develops a much larger torque at speeds near synchronism than it would with an open field circuit.

Thus, in those applications where it is necessary to overcome large resisting torques in starting but where a comparatively low torque is sufficient to maintain rotation, the motor may be started up with an open field circuit because, as has been pointed out, under such conditions it is a characteristic of the motor to develop a large starting torque. On the other hand, the load to be started and accelerated may require a relatively low starting torque but the torque demand may increase rapidly with speed. For such applications it has been customary to start and accelerate the motor with its field included in a local discharge circuit.

However, many loads, such for example as rubber mills, cement mills, etc., require both a large starting torque and a large maintaining torque. It will be obvious that the characteristics of the above mentioned starting methods limits the use of either for starting and accelerating loads of this character. In such installations, if the driving motor be started with its field circuit open, the motor may fail to accelerate beyond a certain subsynchronous speed, while if the motor field were included in a local circuit the motor might fail to start.

In accordance with my invention I start the motor with its field circuit open so as to afford a sufficiently high starting torque. In this way the motor is started and accelerated to a certain sub-synchronous speed. In order to accelerate the motor from this sub-synchronous speed to substantially synchronous speed, I short circuit the field windings, preferably through a discharge resistance. The motor accelerates to substantially synchronous speed after which the motor field can be excited so as to cause the motor to pull into synchronism. Thus, I utilize the high torque range of the open field circuit torque characteristic to start up the load and accelerate it to a sub-synchronous speed, and the high torque range of the closed field circuit torque characteristic to accelerate the motor from the sub-synchronous to substantially synchronous speed.

I provide suitable means for controlling the field circuit so that the field circuit will be maintained open until the motor accelerates to the sub-synchronous speed whereupon the field circuit will be closed so as to permit the motor to attain substantially synchronous speed.

For a more complete understanding of my invention reference should be had to the accompanying drawing, the single figure of which is a diagrammatic representation of a control system embodying my invention.

Referring to the drawing, I have shown my invention in one form in connection with an alternating current synchronous motor 10 having armature windings 11 and field windings 12. It will be understood that the armature windings 11 will be of the three-phase type and will be mounted on the motor stator member, while the field windings 12 will be mounted on the rotor member. It is believed to be unnecessary for a proper understanding of this invention to describe in detail the disposition of these windings since any preferred well-known arrangement may be used. It will also be understood that the synchronous motor will be provided with the usual amortisseur or alternating current starting winding.

As shown, a suitable three-phase alternating current source of supply 13 is provided for the armature windings of the motor, and a suitable direct current source of supply 14 is provided for exciting the field windings 12. In order to control the power connections for the synchronous motor a suitable switch 15, shown as an electroresponsive switch, is interposed in the connections leading to the synchronous motor from the alternating current supply source 13. The operating coil of the power switch 15 is controlled by a suitable master switch 16, shown as a "start" push button, the master switch usually being remotely situated with respect to the motor. It will be understood that a suitable "stop" button 17 will be associated with the control for the motor so that the power connections may be interrupted and the motor thereby deenergized.

The motor field windings are provided with a suitable discharge resistance 18 which in some instances will have a resistance value approximately two or three times as great as the resistance of the field windings themselves. I provide suitable switching mechanism for the field windings 12 so that they can be connected in a local circuit with the discharge resistance 18 or so that they may be connected with the direct current excitation source 14. For this purpose I have provided a pair of controlling switches 20 and 21 each of which is shown to be of the electroresponsive type. As shown, each switch has a pair of contacts in the connections leading to the field windings from the direct current excitation source so that when both switches are closed the field excitation circuit will be completed.

It will be observed that the discharge resistance 18 is connected to the excitation circuit at a point between the two switches 20 and 21 so that a local circuit will be established to include the field windings and the discharge resistance when the switch 20 is closed, providing that the switch 21 remains open, the connections being completed by means of an auxiliary contact 22 provided on the switch 21. It will also be observed that if the switch 20 is closed, it is necessary to close the switch 21 in order to excite the synchronous motor field windings, while if the latter switch be opened the local discharge circuit, referred to above, will be established providing, of course, that the switch 20 remains closed. Normally, however, both switches 20 and 21 are open so that the motor field circuit is open, as shown in the drawing.

I provide suitable timing devices for controlling the operation of the switches 20 and 21 so that the motor can be started up with an open field circuit, and accelerated with the field circuit maintained open for an interval of time sufficient to permit the motor to attain a certain sub-synchronous speed before the discharge circuit is completed, and so that the motor will accelerate from this sub-synchronous speed to substantially synchronous speed before the discharge circuit is interrupted and the field winding excited. The timing control mechanism comprises a pair of timing devices 23 and 24. The timing device 23 operates to energize the operating coil for the switch 20 to close a predetermined interval of time after the operation of the timing device has been initiated, while the timing device 24 operates a predetermined interval of time after its operation has been initiated to effect the energization of the switch 21 to close. The operation of the timing device 24 is initiated responsively to the actuation of the timing device 23 to close the switch 20, while the operation of the timing device 23 is initiated responsively to the establishment of power connections for the synchronous motor. In order to thus control the operation of the timing device 23, I provide a third timing device 25 which is operated immediately upon the closing of the power switch 15 to energize the timing device 23. This timing device 25 has the further function to control the timing devices 23 and 24 to effect the establishment of a field discharge circuit in the event the power switch be opened to deenergize the motor and to maintain it for a predetermined interval of time. It will be understood that any other suitable switching mechanism or relays, examples of which are well known in the art, may be used instead of the timing devices 23 and 24 to control the switches 20 and 21.

The operation of the control system is as follows: With the apparatus in its normal or prestarting position as shown in the drawing, depressing the start button 16 so as to cause it to close its normally open contacts completes an energizing circuit for the electroresponsive power switch 15 from the middle conductor of the alternating current supply source 13 through the closed start button 16, the operating coil of the switch 15 and thence through the conductor 26 to the lower conductor of the alternating current supply source. The switch 15 closes in response to the completion of this energizing circuit and establishes power connections for the motor 10 from the supply source 13. The switch 15 upon being closed establishes a holding circuit for its operating coil independently of the start button, which circuit may be traced from the middle conductor of the alternating current supply source, through the stop button 17, the interlock 27 provided for the switch 15, the operating coil of the switch 15 and thence through the conductor 26 to the lower conductor of the alternating supply source.

The power switch 15 in closing also completes an energizing circuit for the timing device 25. This energizing circuit is completed from the middle conductor of the alternating current supply source 13 through the conductor 28, the interlock 30 provided for the switch 15 and which will be closed to bridge its normally open contacts when the switch 15 is closed, through the conductor 31, the operating coil of the timing device 25 and thence through the conductor 32 to the lower conductor of the alternating current supply source. The timing device 25 has a contact member 33, which is inserted in the circuit to be controlled or in a controlling circuit for the circuit to be controlled. In my control system this contact member will be included in the energizing circuit for the timing device 23. As shown, this contact member 33 normally is open but is biased to its closed position by means of a compression spring 34. The control means for this contact member comprises means for permitting it to close its normally open contacts instantaneously upon the completion of the energizing circuit of the timing device and for causing it to open its contacts a predetermined interval of time after this energizing circuit has been interrupted. This control means comprises a rack member 35 pivotally suspended from the armature 36 so as to normally maintain the contact member 33 in its open position. This rack member is provided with one-way teeth which engage similarly shaped teeth on a ratchet wheel 37, these teeth being shaped so as to permit unobstructed upward movement of the pivotally mounted rack member in response to the energization of the operating coil, but engaging the teeth of the rack to prevent unobstructed downward movement of the rack when the energizing circuit for the device is interrupted. Thus, it will be observed that when the energizing circuit for the timing device is interrupted the weighted rack will tend to descend under the influence of gravity but its downward movement will be retarded by means of the ratchet wheel 37 with which it meshes. The retarding action of this ratchet wheel is effected by means of an escapement wheel 38 connected to be driven by the ratchet wheel and timed in its rotative movement by means of an escapement latch or pendulum 39. Any suitable timing device having the characteristic to close its controlling contact immediately upon being energized and to cause the contact to open a predetermined interval of time after the device is deenergized may be used. Preferably and as shown, however, I will use the timing device described and claimed in the copending application of Robert W. Goff, Serial No. 161,919, filed January 18, 1927, and assigned to the same assignee as this invention.

It will be observed in view of the foregoing discussion that by depressing the start button 16, the power connections for the synchronous motor will be established and the energizing circuit for the timing device 25 will be completed so that its controlling member 33 will be closed to complete an energizing circuit for the timing device 23. The timing device 23, unlike the timing device 25, will operate to close its controlling contact a predetermined interval of time after its operation has been initiated, that is, after its energizing circuit has been completed. It will be understood, therefore, that the synchronous motor will start up as an induction motor with an open field circuit and will accelerate to some sub-synchronous speed the value of which will be determined by the setting of the timing device 23. The timing device 23 usually will be set so as to effect the closure of the switch 20 and thereby the completion of the local field circuit only after the motor has accelerated through substantially the high torque range of the open field torque characteristic. In this manner the motor will be accelerated to a sub-synchronous speed having a value usually between 40 and 60% of the synchronous speed of the motor.

While any suitable timing device having the characteristic to close its controlling contact a time interval after being energized and to open its contact immediately upon being deenergized may be used for the switch 23, I prefer to use the timing device disclosed in the United States patent granted to H. M. Stephenson, No. 1,699,125 and dated January 15, 1929. It will be observed that when the controlling contact 33 of the timing device 25 has been closed, the electromagnets 40 and 41 of the timing device 23 will be energized. The energization of the electromagnet 40 causes the armature 42 associated therewith to be attracted and as a result the worm 43 is brought into engagement with the worm wheel 44. The switch contacts 45 are mechanically held in their closed position, as shown in the drawing, by means of the latch 46, despite the tendency of the resilient hooked switch arm 47 associated with the armature 42 to open these contacts when the electromagnet 40 is energized. The electromagnet 41 and the disc 48 of non-magnetic electrically conducting material are intended to indicate diagrammatically an alternating current motor. As the disc 48 rotates the worm wheel 44 will be caused to rotate by means of the worm 43 so that eventually the pin 50 will engage the pivoted catch 46 and move the catch out of engagement with the lower end of the switch lever carrying one of the contacts 45. When the catch 46 is released, the resilient switch member 47 opens the contacts 45 and closes the contacts 51. When the contacts 45 are open, the electromagnet 41 is deenergized so that the worm wheel 44 will not be rotated further. It will be observed, however, that the electromagnet 40 will remain energized and thus will operate to hold the armature 42 and the contacts 51 closed. When the contacts 51 are closed, an energizing circuit for the switch 20 will be completed which circuit may be traced from the lower conductor of the alternating current supply source 13 through the conductor 32, the closed contact 33 of the timing switch 25, the resilient switch arm 47 of the timing device 23, the closed contacts 51, the conductor 52, the operating coil of the switch 20 and thence through the conductor 53 to the middle conductor of the alternating current supply source. The switch 20 will close in response to the completion of this energizing circuit and, therefore, by reason of the fact that the switch 21 is in its open position, will complete a local circuit including the field windings 12 of the synchronous motor and the discharge resistance 18. The synchronous motor will, therefore, accelerate as an asynchronous motor with a closed field circuit from the sub-synchronous speed to which it has accelerated with an open field circuit to a higher sub-synchronous speed the value of which will be determined by the setting of the timing device 24. Usually the motor will be accelerated with its field circuit closed to substantially 95% synchronous speed.

The timing device 24 is shown to have the same construction as the timing device 23. In order to initiate the operation of the timing device 24 responsively to the actuation of the timing device 23 to effect the closure of the switch 20, I provide the switch 20 with an interlock 55 which operates to close its normally open contacts when the switch 20 is closed. It will be observed that when the interlock 55 is closed, an energizing circuit for the electromagnets 56 and 57 of the timing device 24 will be completed from the middle conductor of the alternating current supply source 13 through the conductor 28, the interlock 30 of the switch 15, the conductor 31, the conductor 58, the closed interlock 55, the electromagnets 56 and 57 and thence through the conductor 60 to the lower conductor of the alternating current supply source. The operation of the timing device 24, therefore, is initiated, and at the end of a predetermined interval of time, the length of which will depend upon the setting of the device, the contacts 61 of the device will be opened while its contacts 62 will be closed. The opening of the contacts 61 deenergizes the electromagnet 57, while the closing of the contacts 62 completes an energizing circuit for the switch 21 which circuit may be traced from the middle conductor of the alternating current supply source 13 through the conductor 28, the interlock 30, the conductor 31, the conductor 58, the closed interlock 55, the closed contacts 62, the conductor 63, the operating coil of the switch 21 and thence through the conductor 60 to the lower conductor of the alternating current supply source. The switch 21 will close in response to the completion of this energizing circuit and thereby will interrupt the local circuit including the field windings and the discharge resistance 18 and complete the excitation circuit for the field windings 12 from the direct current supply source 13.

It will be understood that the timing device 24 will have been set so as to interpose a time interval between the closing of the switch 20 and the closing of the switch 21 which will be sufficient to permit the motor to accelerate as an asynchronous motor with its field circuit closed to substantially synchronous speed. Therefore, when the switch 21 is closed the motor field windings will be excited and the motor will pull itself into synchronism.

In order to deenergize the motor it is merely necessary to depress the stop button 17. It will be observed that when the stop button 17 is depressed to open its normally closed contacts the energizing circuit for the operating coils of the power switch 15 and the timing device 25 will be interrupted; it will also be observed that the operating coil of the switch 21 will be interrupted. However, the operating coil of the switch 20 will be maintained energized for an interval of time determined by the setting of the timing device 25. Thus, it will be observed that when the operating coil of the timing device 25 is deenergized the controlling contact 33 of the device will remain closed for a time interval determined by the descent of the weighted rack 35. As long as this controlling contact 33 remains closed, the electromagnet 40 of the timing device 23 will be energized and the contacts 51 will remain closed to complete the energizing circuit for the operating coil of the switch 20. Thus, it will be observed that upon depressing the stop button 17 the switch 21 will open immediately to disconnect the fields from their direct current excitation source 14 and to complete a local discharge circuit for the field windings through the resistance 18. At the end of a predetermined time interval, as determined by the descent of the weighted rack 35, the controlling contact 33 will be opened to interrupt the energizing circuit for the switch 20. The switch 20 will be opened in response to the interruption of this circuit and thereby open circuit the motor field windings. The motor is now in condition to be restarted.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A control system for starting and accelerating an alternating current synchronous motor having field windings in a normally open circuit comprising switching means for establishing power connections for said motor, means for connecting said field windings in a local circuit and for connecting said windings to a source of excitation, and time element means controlled by said switching means for controlling said connecting means so that said field winding local circuit is completed an interval of time after the establishment of said motor power connections and is maintained closed until said motor has attained substantially synchronous operating conditions whereupon said motor field windings are excited.

2. A control system for starting and accelerating an alternating current synchronous motor having field windings in a normally open circuit comprising switching means for establishing power connections for said motor, control means for including said field windings in a local circuit and timing means controlled by said switching means for controlling said field winding controlling means so that said field winding local circuit is established a predetermined interval of time after the establishment of said motor power connections and is maintained closed for a predetermined interval of time whereby said motor accelerates to a sub-synchronous speed with an open field circuit and to substantially synchronous speed with its field windings included in said local circuit.

3. A control system for starting and accelerating an alternating current synchronous motor having field windings comprising means for establishing powed connections for said motor, means for providing a local discharge circuit for said field windings and time element means operable responsively to the establishment of said power connections for controlling said local discharge circuit so that upon said power connections being established to start said motor, said timing means operates to maintain the field winding circuit open for an interval of time so that said motor accelerates to a predetermined sub-synchronous speed, and then operates to include said field windings in said local discharge circuit for an interval of time to permit said motor to accelerate to substantially synchronous speed.

4. A control system for starting and accelerating an alternating current synchronous motor having field windings comprising means connecting said motor to an alternating current source of supply, means including a timing device responsive to the operation of said first means for controlling said field winding circuit so that said circuit is closed a predetermined interval of time after said first means is operated to connect said motor with said alternating current supply source and means including a second timing device responsive to the operation of said first timing device for controlling said field winding circuit so that said circuit is opened and is connected with a direct current excitation source a predetermined interval of time after said first timing device has operated to close said field winding circuit.

5. A control system for starting and accelerating an alternating current synchronous motor having field windings comprising switching means for connecting said motor with an alternating current source of supply, a resistance, a second switching means for controlling said field windings and said resistance so that said field windings may be open circuited, included in a local circuit with said resistance and connected with a direct current excitation source, and time element switching means for controlling said second switching means responsively to the operation of said first switching means so that when said first switching mechanism operates to connect said motor with its alternating current supply source said motor is started with its field circuit open and the operation of said timing mechanism is initiated so that after a predetermined interval of time has elapsed said field winding is included in a local circuit with said resistance for a predetermined interval of time after which said field windings are connected with their direct current source of excitation.

6. The combination with an alternating current synchronous motor having field windings and an alternating current starting winding of a source of alternating current supply for said motor, a direct current excitation source for said motor field windings, a discharge resistance for said field windings, switching means for connecting said motor with said alternating current supply source, a pair of switches for controlling said field windings so that when one of said switches is closed said field windings are included in a local circuit with said discharge resistance and when both are closed said field windings are connected with said direct current excitation source, a timing switch for controlling said one switch, the operation of said timing switch being initiated responsively to the connection of said motor with said alternating current supply source so that a predetermined interval of time after said connections are established said timing switch is actuated to close said one switch and thereby include said field windings in a local circuit with said discharge resistance, a second timing switch for controlling the other of said field controlling switches, the operation of said second timing switch being initiated responsively to the actuation of said first timing switch so that a predetermined interval of time after said windings have been included in said local circuit said second timing switch is actuated to close said second switch and thereby connect said windings with said direct current excitation source.

7. A control system for an alternating current synchronous motor having field windings in a normally open circuit comprising switching means for connecting said motor with an alternating current source of supply and for disconnecting said motor from said supply source, means for including said field windings in a local circuit and time element means controlled by said switching means for controlling said second means so that when said motor is disconnected from the said alternating current supply source said field windings are included in said local circuit for a predetermined interval of time.

8. A control system for an alternating current synchronous motor having field windings in a normally open circuit comprising switching means for connecting said motor with an alternating current source of supply and for disconnecting said motor from said supply source, a discharge resistance for said field windings, and time element means operable responsively to the operation of said switching means for controlling said field windings so that when said motor is disconnected from said alternating current supply source, said field windings are included in a local circuit with said discharge resistance for a predetermined interval of time.

9. A system of control for an alternating current synchronous motor having field windings comprising means for establishing alternating current power connections for said motor and for interrupting said power connections, a resistance, switching means for including said field windings and said resistance in a local circuit, and for connecting said field windings to a direct current excitation source, means including a pair of definite time element devices for controlling said switching means, one of said timing devices operating a predetermined interval of time after its operation has been initiated to cause said switching means to establish said local circuit, and the other operating a predetermined interval of time after its operation has been initiated to cause said switching means to interrupt said local circuit and to connect said field windings to the direct current excitation source, the operation of said second timing device being initiated responsively to the actuation of said first timing device, and a third timing device operable responsively to the operation of said power connection controlling means for controlling the first and second timing devices so that the operation of said first timing device is initiated upon said alternating current power connections being established and so that upon said power connections being interrupted said timing devices effect an operation of said switching means to include said field windings in a local discharge circuit with said resistance for a predetermined interval of time determined by the operation of said third timing device.

In witness whereof, I have hereunto set my hand this 10th day of March, 1930.

RICHARD M. MATSON.